United States Patent [19]

Anderson et al.

[11] Patent Number: 4,699,175

[45] Date of Patent: Oct. 13, 1987

[54] FLAPPER ACTUATED PILOT VALVE

[75] Inventors: R. David Anderson; George S. Jacobs, both of Wichita Falls, Tex.

[73] Assignee: Mizer Controls, Inc., Shreveport, La.

[21] Appl. No.: 925,513

[22] Filed: Oct. 27, 1986

Related U.S. Application Data

[63] Continuation of Ser. No. 702,465, Feb. 19, 1985, abandoned.

[51] Int. Cl.$^4$ .................... G05D 16/00; F16K 11/04
[52] U.S. Cl. .................... 137/627.5; 137/85; 137/488; 137/596; 137/625.5
[58] Field of Search .................... 137/55, 627.5, 596, 137/596.1, 625.5, 488

[56] References Cited

U.S. PATENT DOCUMENTS

| | | | |
|---|---|---|---|
| 2,912,993 | 11/1959 | Jones | 137/85 |
| 2,980,075 | 4/1961 | Cunningham | 137/85 X |
| 3,052,254 | 9/1962 | Parks | 137/85 |
| 3,078,716 | 2/1963 | Winters | 137/85 X |
| 3,127,189 | 3/1964 | Schultz | 137/627.5 X |
| 3,181,917 | 4/1965 | Dobrikin | 137/627.5 X |
| 3,416,843 | 12/1968 | Kobnick | 137/627.5 X |

Primary Examiner—Alan Cohan
Attorney, Agent, or Firm—Charles D. Gunter

[57] ABSTRACT

A flapper actuated pilot valve is shown in which the output pressure from the valve is dependent upon and proportional to the force exerted by the flapper. The valve includes a valve body with upper and lower chambers and an interconnecting gas passage. A spring-biased poppet in the lower chamber has a primary sealing surface for sealing off the lower chamber and a secondary sealing surface which is contacted by a flapper element located in the upper chamber. The flapper element has an interior bore leading to an exhaust port in an upper end of the flapper element which extends through an opening in the valve body. The flapper element is supported within the upper chamber by means of a pressure sensitive diaphragm. The diaphragm area and primary and secondary sealing areas cooperate so that to provide an outlet gas pressure which is proportional to the external force supplied by the flapper upon the flapper element.

8 Claims, 2 Drawing Figures

FLAPPER ACTUATED PILOT VALVE

This application is a continuation of application Ser. No. 702,465, filed Feb. 19, 1985, now abandoned.

BACKGROUND OF THE INVENTION

1. Field of the Invention

The present invention relates to pilot valves of the type used to send an output signal pressure to a pneumatically operated, process valve for controlling the valve and, specifically, to a flapper actuated pilot valve where the output signal pressure is proportional to the force applied by the flapper.

2. Description of the Prior Art

The oil and gas, chemical and other industries utilize process valves for controlling the flow of process fluids which are operated by means of a pneumatic control signal. The pneumatic control for such valves typically includes a pilot valve whose function is to send an output signal pressure to the pneumatic controller, which either opens or closes the process valve.

For instance, in the case of an oil and gas separator tank, a liquid level controller is provided which uses a "float" or displacement type sensor to transmit changes in the liquid level in the tank to a pilot valve outside the vessel. The pilot valve signals a process control or discharge valve in the discharge outlet from the vessel to open or close the discharge valve in response to the liquid level within the vessel. The float within the vessel interior is connected to a "flapper" outside the vessel which, in turn, acts upon the pilot valve.

Supply gas pressure is generally taken from the production gas and routed to the pilot valve. When the liquid level in the vessel is within the desired limit, the supply gas is vented through the pilot valve to the atmosphere. When the liquid level rises sufficiently to change the position of the float, the flapper applies a force to the pilot valve so that supply gas is diverted within the pilot valve to thereby provide a control signal to the discharge valve and allow liquid to flow from the vessel.

Our copending application Ser No. 559,325, filed Dec 8, 1983, entitled "Pilot Valve For An Oil And Gas Separator" shows such a pilot valve in which the output control pressure is not dependent upon the force applied by the flapper to the pilot valve. That is, the pilot valve operates in "on-off" fashion to either emit an output control pressure or to vent the control pressure to the atmosphere. In other types of pneumatically controlled valves, such as those featuring Bourdon tube controllers, it is desirable to provide a pilot valve which outputs a control pressure which is dependent upon the flapper force applied to the pilot valve.

There exists a need for a flapper actuated pilot valve in which the output control signal emitted by the valve is proportional to the flapper force applied to the valve.

SUMMARY OF THE INVENTION

The flapper actuated pilot valve of the invention has a valve body with an upper chamber, lower chamber and a gas passage which communicates the lower chamber, by means of a gas passage opening, with the upper chamber. A gas inlet communicates with the lower chamber for supplying control gas pressure to the valve and a gas outlet in the upper chamber allows the flow of control gas pressure from the valve. A poppet is provided having a lower end with a primary sealing surface for contacting the gas passage opening into the lower chamber to seal off the lower chamber from the upper chamber. The poppet has an upper end which extends into the upper chamber and the upper end of the poppet has a secondary sealing surface thereon. A flapper element is provided having a lower portion which is adapted to contact the secondary sealing surface of the poppet and has an upper portion which extends through an opening in the valve body for contacting the flapper. The flapper element has an interior bore which runs from the lower portion thereof to an exhaust port for exhausting control gas pressure from the upper chamber. The secondary sealing surface of the poppet serves to block the escape of control gas pressure when the secondary sealing surface of the poppet contacts the flapper element lower portion.

A coil spring located in the lower chamber normally urges the primary sealing surface of the poppet against the gas passage opening in the absence of an external force applied by the flapper on the flapper element. The flapper element is supported within the upper chamber by a pressure responsive diaphragm which seals the upper chamber from the atmosphere. An increase in control gas pressure within the upper chamber acts upon the diaphragm and, in turn, the flapper element to open the flapper element exhaust port and exhaust control gas pressure to the atmosphere.

The diaphragm, primary and secondary sealing surfaces of the pilot valve cooperate together to provide a pilot valve in which the output signal pressure from the pilot valve is proportional to the force applied by the flapper upon the flapper element.

Additional objects, features and advantages will be apparent in the written description which follows.

DETAILED DESCRIPTION OF THE INVENTION

Figure 1:
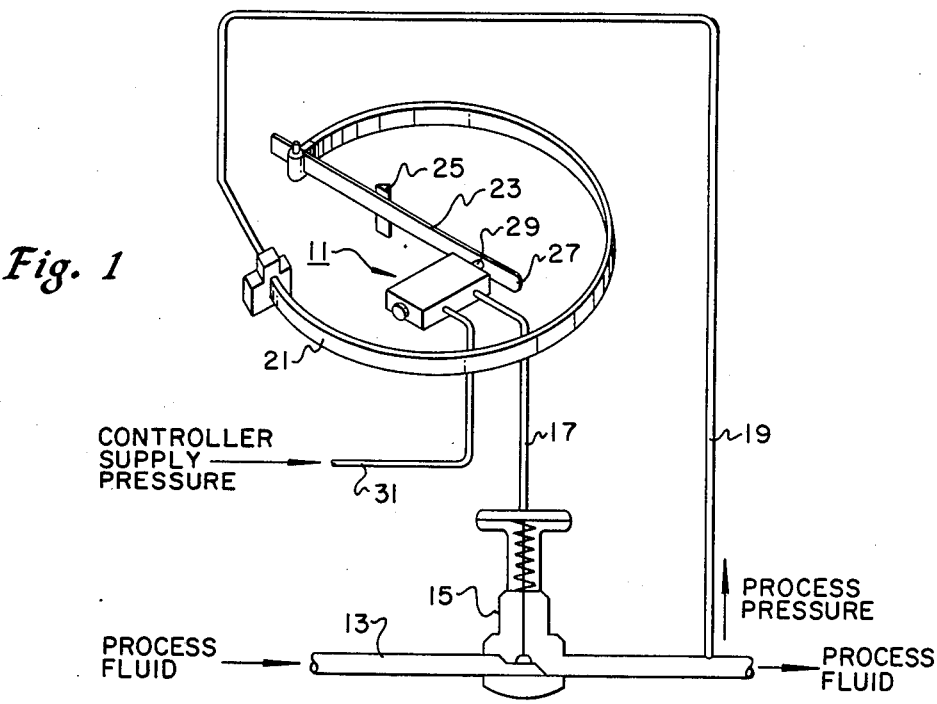
FIG. 1 is a simplified, schematic view of a Bourdon tube controller utilizing a flapper actuated pilot valve of the invention.

FIG. 1 is a simplified, schematic view which shows a flapper actuated pilot valve 11 as it would be used in a Bourdon tube type process controller. The flow of process fluid in a pipe 13 is controlled by means of a process control valve 15. The valve 15 is pneumatically operated by means of a signal pressure in the conduit 17. Such valves are well known and are commercially available. The process pressure is detected and routed through a conduit 19 to one end of a Bourdon tube 21. The tube expands as the pressure increases and bends a flapper 23 around a fulcrum 25 so that the free end 27 contacts a flapper element 29 of the pilot valve 11. As will be explained, the force exerted by the flapper 23 upon the flapper element 29 causes a pressurized control signal which enters the pilot valve 11 through conduit 31 to pass through the conduit 17 to the process control valve 15. The magnitude of the control signal which travels from the pilot valve through conduit 17 is proportional to the force applied to the flapper element 29 by the flapper 23. The control signal in conduit 17 causes the process control valve 15 to open or close in incremental fashion to thereby control the flow of process fluid in the pipe 13.

Figure 2:
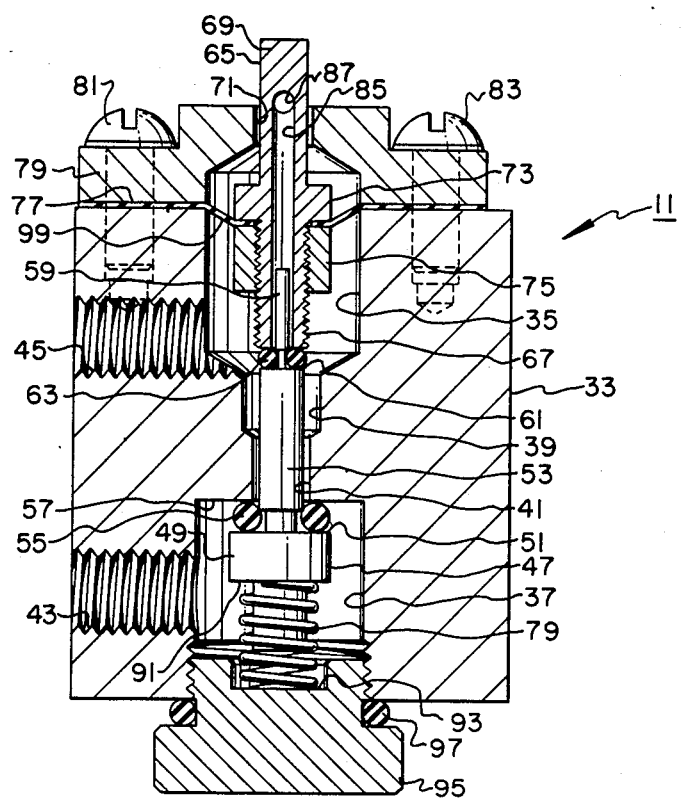
FIG. 2 is a side, cross-sectional view of the flapper actuated pilot valve of the invention.

Turning to FIG. 2, the pilot valve 11 has an upper chamber 35, a lower chamber 37 and a gas passage 39 which communicates the lower chamber, by means of a gas passage opening 41, with the upper chamber 35. A gas inlet 43 communicates with the lower chamber 37 for supplying control gas pressure to the valve 11. A gas outlet 45 is provided in the upper chamber 35 for allowing the flow of control gas pressure from the valve through the conduit 17 (FIG. 1) leading to the process control valve 15.

A poppet 47 has a lower end 49 with a primary sealing surface 51. The primary sealing surface comprises a shoulder formed between the greater relative external diameter of the lower end 49 and the lesser relative external diameter of a mid region 53 of the poppet 47. An O-ring 55 rides upon the shoulder 51 and, in the position shown, contacts the chamber walls 57 of the lower chamber 37. The O-ring 55 thus serves to seal off the lower chamber 37 from the upper chamber 35.

The poppet 47 also has an upper end 59 of lesser relative external diameter than the mid region 53. A shoulder 61 formed between the mid region 53 and upper end 59 comprises a secondary sealing surface which carries O-ring 63.

A flapper element 65 is provided in the upper chamber 35 having a lower portion 67 which is adapted to contact the secondary sealing surface 61 of the poppet 47. The flapper element 65 also has an upper portion 69 which extends through an opening 71 in the valve body 33 for contacting a flapper, such as flapper 23 in FIG. 1. The flapper element lower portion 67 and upper portion 69 are generally cylindrically shaped and joined by a cylindrical mid portion 73. The exterior of the lower portion 67 is threaded to receive a nut 75 for engaging a flexible, pressure sensitive diaphragm 77.

As shown in FIG. 2, the diaphragm 77, in the position shown, seals off the upper chamber 35 which is below the diaphragm 77 from the opening 71 and the atmosphere. The periphery of the diaphragm 77 is secured by means of a cover plate 79 and bolts 81, 83 which retain the cover plate 79 on the valve body 33.

The flapper element 65 also has an interior bore 85 which runs from an opening in the lower portion 67 thereof to an exhaust port 87 located on the opposite side of the diaphragm 77 from the opening into the upper chamber 35. The secondary sealing surface 61 of the poppet 47 serves to block the escape of control gas pressure within the upper chamber 35 through the exhaust port 87 when the secondary sealing surface 61 is contacting the opening into the interior bore of the flapper element lower portion 67.

A biasing means such as coil spring 89 is located within the lower chamber 37 between a shoulder 91 formed upon the poppet 47 and a recess 93 formed in end cap 95. The spring 89 normally urges the poppet 47 and primary sealing surface 51 against the gas passage opening 41 in the absence of an external force applied by the flapper upon the flapper element 65. The end cap 95 is threadedly engaged within the lower chamber 37 and includes an O-ring seal 97.

As shown in FIG. 2, the poppet upper end 59 is slidably received within the lower extent of the flapper element interior bore 85. The external diameter of the end 59 of poppet 47 is sized to leave an annular space between the exterior surface thereof and the surrounding interior bore 85 to allow the flow of control gas pressure from the upper chamber 35 through the exhaust port 87 when the secondary sealing surface 61 moves out of contact with the lower portion 67 of the flapper element 65.

The primary sealing surface O-ring 55 presents a greater relative surface sealing area than the secondary sealing surface O-ring 63. Because of the difference in surface areas, the primary sealing surface 51 will not open until after the secondary sealing surface 61 has closed and the secondary sealing surface 61 will close before the primary sealing surface 51 opens. The pressure sensitive diaphragm area 99 which is exposed to the control gas pressure in the upper chamber is larger than the primary sealing surface area, so that the force opening and closing the primary and secondary sealing surfaces is the resultant of the external force applied by the flapper minus the diaphragm force.

These principles will be explained in greater detail in the following operational discussion of the pilot valve of the invention. Assume first that a surge in process fluid in pipe 13 causes an increase in the pressure detected in conduit 19 leading to the Bourdon tube 21. As the tube 21 expands, flapper 23 is bent about the fulcrum 25, causing the flapper to apply a force to the flapper element 29. As the force is applied to the flapper element, three actions occur within the valve body in order. First, the flapper element lower portion 67 compresses the O-ring 63 against the shoulder 61, closing off any possible gas flow from the upper chamber 35 through the exhaust port 87. Secondly, the primary sealing surface 51 moves away from the gas passage opening 41, allowing control gas from the inlet 43 to pass to the upper chamber 35, thereby causing a pressure increase in the chamber 35 and gas outlet 45. Thirdly, the increase in control gas pressure in the upper chamber 35 acts against the pressure sensitive area 99 of the diaphragm 77 causing a force to push against and oppose the force applied to the flapper element 65 by the flapper 23.

The forces described equalize. When the outlet pressure in the upper chamber 35 increases to the point that the diaphragm force is greater than the external force on the flapper, the primary sealing surface 51 will again seat against the gas passage opening 41 and close off the gas inlet. After the primary sealing surface has again seated, a further increase within the upper chamber 35 is prevented. An increase in outlet pressure from the upper chamber 35 can only be achieved at this point by an increase in the external force applied by the flapper 23 upon the flapper element 65, which would begin the cycle again.

As the force applied by the flapper 23 to the flapper element decreases, three actions occur in order. First, the primary sealing surface seats against the gas passage opening 41 and closes off any gas flow from the gas inlet to the upper chamber 35. Secondly, the secondary sealing O-ring 63 moves off the lower portion 67 of the flapper element 65, allowing gas to flow from the upper chamber 35 through the interior bore 85 and exhaust port 87 to the atmosphere. This action decreases the outlet pressure in the upper chamber 35. Thirdly, the pressure decrease in the upper chamber 35 decreases the force which the diaphragm 77 applies to the flapper element 65. As the diaphragm force decreases, the external force applied by the flapper 23 overcomes the diaphragm force, causing the secondary seal 63 to close. A further decrease in the upper chamber pressure can only be achieved by a decrease in the external flapper force which would repeat the cycle.

The primary seal formed by the O-ring 55 cannot be opened until the secondary seal formed by O-ring 63 is closed. This is true because the O-ring 55 has a larger sealing surface than the O-ring 63. The force necessary to break the primary seal 55 is equal to the area of the sealing surface of O-ring 55 times the difference of the pressures in the outlet and inlet chambers. Similarly, the force required to break the secondary O-ring seal 63 is equal to the seal area of the O-ring 63 times the difference of the outlet and atmospheric pressures. From the relationship of these forces and the fact that the inlet pressure is constant, it can be seen that the force required to open the primary seal and close the secondary seal is dependent upon the respective areas of the sealing surfaces. By making the surface area ratio of the primary O-ring 55 to the secondary O-ring 63 in the range from about 1.5:1 to 5:1, the secondary seal 61 will always close before the primary seal 51 opens.

The diaphragm 77 serves as a compensating or modulating means associated with the flapper element 65 whereby a known external force acting upon the flapper element 65 produces a known control gas pressure at the outlet 45. As shown in FIG. 2, the diaphragm pressure causes a force upon the flapper element 65 which opposes the external force of the flapper 23. As the control gas pressure increases in the upper chamber 35, the diaphragm force increases and eventually overcomes the external force applied by the flapper. If the upper chamber pressure decreases, the diaphragm force decreases, allowing the external force applied by the flapper to rule.

It can thus be seen that the force which opens and closes the primary and secondary sealing surfaces is the resultant of the external force applied by the flapper minus the diaphragm force. If the diaphragm force minus the flapper force results in a positive value, the secondary sealing surface 61 opens and the primary sealing surface 51 closes. If the external force applied by the flapper minus the diaphragm force results in a positive value, the primary sealing surface 51 opens and the secondary sealing surface 61 closes.

The diaphragm force is equal to the output pressure minus the atmospheric pressure times the diaphragm area. The ratio of the change in external flapper force to the change in output pressure is thus governed by the bore of the upper chamber 35, and hence the pressure responsive area 99 of the diaphragm 77. Although the diaphragm area 99 must exceed the sealing surface area of the primary surface 51, the bore of chamber 35 can be varied to achieve different ratios between the flapper force and output pressure. Thus, the output pressure can be made proportional to the flapper force so that a given force results in a given output and doubling that force results in a doubling of the output pressure.

An invention has been provided with several advantages. The flapper actuated pilot valve of the invention is relatively simple in design and reliable in operation. The valve can be inserted in many existing pressure controllers without the necessity of modifying the controller structure. The control gas pressure is only exhausted when the secondary sealing surface is open, thereby resulting in a savings in control gas supplied to the unit. The output of the pilot valve of the invention is dependent upon and proportional to the flapper force making the valve well suited for use in proportional control environments.

While the invention has been shown in only one of its forms, it is not thus limited but is susceptible to various changes and modifications without departing from the spirit thereof.

We claim:

1. A flapper actuated pilot valve, comprising:
    a valve body having an upper chamber, a lower chamber, and a gas passage which communicates said lower chamber, by means of a gas passage opening, with said upper chamber;
    a gas inlet which communicates with said lower chamber for supplying control gas pressure to said valve and a gas outlet in said upper chamber for allowing the flow of control gas pressure from said valve;
    a poppet having a stepped cylindrical shape including a lower end of a greater relative external diameter joined to a cylindrical mid region of lesser relative external diameter than said lower end, said junction of said lower end and said mid region forming a primary sealing surface for contacting said gas passage opening into said lower chamber to seal off said lower chamber from said upper chamber, said cylindrical mid region being joined to a cylindrical upper end of lesser relative external diameter than said mid region, said junction of said mid region and said upper end forming a secondary sealing surface, said primary sealing surface presenting a greater sealing area than said secondary sealing surface, said cylindrical mid region including an o-ring groove at the junction with said lower end, said groove having an o-ring of generally circular transverse cross-section, at least a portion of said o-ring extending inwardly within said groove, and wherein said upper end of said poppet extends into said upper chamber;
    a flapper element having a lower portion adapted to contact the secondary sealing surface of said poppet and having an upper portion which extends through an opening in said valve body for contacting said flapper, said flapper element having an interior bore which runs from a lower portion thereof to an exhaust port for exhausting control gas pressure from said upper chamber, the secondary sealing surface of said poppet serving to block the escape of control gas pressure when said secondary sealing surface contacts said flapper element lower portion; and
    compensating means associated with said flapper element within said upper chamber and subject to changes in control gas pressure within said upper chamber, whereby a known external force acting on said flapper element produces a known control gas pressure at said outlet, the outlet gas pressure being proportional to the external force applied by said flapper, said compensating means including a diaphragm which supports said flapper element within said upper chamber and which seals said upper chamber from the atmosphere, whereby an increase in control gas pressure within said upper chamber acts upon said diaphragm and, in turn, said flapper element to open said exhaust port.

2. The flapper actuated pilot valve of claim 1, further comprises:
    biasing means located within said lower chamber for normally urging said primary sealing surface against said gas passage opening in the absence of an external force applied by said flapper on said flapper element.

3. The flapper actuated pilot valve of claim 2, wherein said biasing means is a coil spring located within said lower chamber, said coil spring encircling a portion of said poppet lower end.

4. A flapper actuated pilot valve, comprising:
- a valve body having an upper chamber, a lower chamber, and a gas passage which communicates said lower chamber, by means of a gas passage opening, with said upper chamber;
- a gas inlet which communicates with said lower chamber for supplying control gas pressure to said valve and a gas outlet in said upper chamber for allowing the flow of control gas pressure from said valve;
- a poppet having a stepped cylindrical shape including a lower end of a greater relative external diameter joined to a cylindrical mid region of lesser relative external diameter than said lower end, said junction of said lower end and said mid region forming a primary sealing surface for contacting said gas passage opening into said lower chamber to seal off said lower chamber from said upper chamber, said cylindrical mid region being joined to a cylindrical upper end of lesser relative external diameter than said mid region, said junction of said mid region and said upper end forming a secondary sealing surface, said primary sealing surface presenting a greater sealing area than said secondary sealing surface, the surface area ratio of the primary sealing surface to the secondary sealing surface being in the range from about 1.5:1 to 5:1, said cylindrical mid region including an o-ring groove at the junction with said lower end and said cylindrical upper end including an o-ring groove at the junction with said mid region, each of said grooves having an o-ring of generally circular transverse cross-section, at least a portion of each of said o-rings extending inwardly within its respective groove, and wherein said upper end of said poppet extends into said upper chamber;
- a flapper element having a lower portion adapted to contact the secondary sealing surface of said poppet and having an upper portion which extends through an opening in said valve body for contacting said flapper, said flapper element having an interior bore which runs from a lower portion thereof to an exhaust port for exhausting control gas pressure from said upper chamber, the secondary sealing surface of said poppet serving to block the escape of control gas pressure when said secondary sealing surface contacts said flapper element lower portion; and
- compensating means associated with said flapper element within said upper chamber and subject to changes in control gas pressure within said upper chamber, whereby a known external force acting on said flapper element produces a known control gas pressure at said outlet, the outlet gas pressure being proportional to the external force applied by said flapper, said compensating means including a diaphragm which supports said flapper element within said upper chamber and which seals said upper chamber from the atmosphere, whereby an increase in control gas pressure within said upper chamber acts upon said diaphragm and, in turn, said flapper element to open said exhaust port.

5. A flapper actuated pilot valve, comprising:
- a valve body having an upper chamber, a lower chamber, and a gas passage which communicates said lower chamber, by means of a gas passage opening, with said upper chamber;
- a gas inlet which communicates with said lower chamber for supplying control gas pressure to said valve and a gas outlet in said upper chamber for allowing the flow of control gas pressure from said valve;
- a poppet having a stepped cylindrical shape including a lower end of a greater relative external diameter joined to a cylindrical mid region of lesser relative external diameter than said lower end, said junction of said lower end and said mid region forming a primary sealing surface for contacting said gas passage opening into said lower chamber to seal off said lower chamber from said upper chamber, said cylindrical mid region being joined to a cylindrical upper end of lesser relative external diameter than said mid region, said junction of said mid region and said upper end forming a secondary sealing surface, said primary sealing surface presenting a greater sealing area than said secondary sealing surface, the surface area ratio of the primary sealing surface to the secondary sealing surface being in the range of about 1.5:1 to 5:1, said cylindrical mid region including an o-ring groove at the junction with said lower end and said cylindrical upper end including an o-ring groove at the junction with said mid region, each of said grooves defining an upper and a lower shoulder of a given radius on said poppet, the radius of each of said lower shoulders being greater than that of its respective upper shoulder, each of said grooves having an o-ring, at least a portion of each of said o-rings extending inwardly within its respective groove, and wherein said upper end of said poppet extends into said upper chamber;
- a flapper element having a lower portion adapted to contact the secondary sealing surface of said poppet and having an upper portion which extends through an opening in said valve body for contacting said flapper, said flapper element having an interior bore which runs from a lower portion thereof to an exhaust port for exhausting control gas pressure from said upper chamber, the secondary sealing surface of said poppet serving to block the escape of control gas pressure when said secondary sealing surface contacts said flapper element lower portion; and
- compensating means associated with said flapper element within said upper chamber and subject to changes in control gas pressure within said upper chamber, whereby a known external force acting on said flapper element produces a known control gas pressure at said outlet, the outlet gas pressure being proportional to the external force applied by said flapper, said compensating means including a diaphragm which supports said flapper element within said upper chamber and which seals said upper chamber from the atmosphere, whereby an increase in control gas pressure within said upper chamber acts upon said diaphragm and, in turn, said flapper element to open said exhaust port.

6. The flapper actuated pilot valve of claim 1, wherein said flapper element interior bore forms a cylindrical passage of uniform internal diameter, said uniform diameter being greater than the diameter of said poppet cylindrical upper end, said poppet upper end being received within said flapper element interior bore.

7. The flapper actuated pilot valve of claim 1, wherein said diaphragm forms the sole support for said flapper element within said upper chamber when said exhaust port is open.

8. The flapper actuated pilot valve of claim 1, wherein said upper chamber has vertically extending side walls and wherein said gas outlet is located at one point in said vertical side walls and passes from said upper chamber through said side wall directly to the exterior of said valve.

* * * * *